United States Patent [19]
Willsey

[11] Patent Number: 5,754,761
[45] Date of Patent: May 19, 1998

[54] UNIVERSAL SOFEWARE KEY PROCESS

[76] Inventor: John A. Willsey, 5521 Greenville Ave., #104-722, Dallas, Tex. 75206

[21] Appl. No.: 920,577

[22] Filed: Aug. 29, 1997

Related U.S. Application Data

[63] Continuation of Ser. No. 398,923, Mar. 6, 1995, abandoned.
[51] Int. Cl.$^6$ .................................................. G06F 12/14
[52] U.S. Cl. ............... 395/186; 395/187.01; 395/188.01; 380/4
[58] Field of Search ................ 380/4, 44; 395/186, 395/187.01, 188.01

[56] References Cited

U.S. PATENT DOCUMENTS

| | | | |
|---|---|---|---|
| 4,446,519 | 5/1984 | Thomas | 364/200 |
| 4,644,493 | 2/1987 | Chandra et al. | 380/4 |
| 4,654,792 | 3/1987 | Thomas | 364/200 |
| 4,685,055 | 8/1987 | Thomas | 364/200 |
| 4,817,140 | 3/1989 | Chandra et al. | 380/4 |
| 4,888,798 | 12/1989 | Earnest | 380/4 |
| 5,065,429 | 11/1991 | Lang | 380/25 |
| 5,081,675 | 1/1992 | Kittirutsunetorn | 380/4 |
| 5,081,676 | 1/1992 | Chou et al. | 380/4 |
| 5,109,413 | 4/1992 | Comerford et al. | 380/4 |
| 5,144,667 | 9/1992 | Pogue, Jr. et al. | 380/4 |
| 5,199,066 | 3/1993 | Logan | 380/4 |
| 5,220,604 | 6/1993 | Glasser et al. | 380/23 |
| 5,222,133 | 6/1993 | Chou et al. | 380/4 |
| 5,239,648 | 8/1993 | Nukui | 395/600 |
| 5,311,591 | 5/1994 | Fisher | 380/4 |
| 5,315,657 | 5/1994 | Abadi et al. | 380/25 |
| 5,319,705 | 6/1994 | Halter et al. | 380/4 |
| 5,337,357 | 8/1994 | Chou et al. | 380/4 |
| 5,386,369 | 1/1995 | Christiano | 705/400 |
| 5,416,840 | 5/1995 | Cane et al. | 380/4 |
| 5,491,751 | 2/1996 | Paulson et al. | 380/25 |
| 5,557,346 | 9/1996 | Lipner et al. | 380/21 |
| 5,613,012 | 3/1997 | Hoffman et al. | 382/115 |
| 5,651,064 | 7/1997 | Newell | 380/4 |

Primary Examiner—William M. Treat
Assistant Examiner—Zarni Maung
Attorney, Agent, or Firm—Daniel V. Thompson

[57] ABSTRACT

A process of creating software key files, the software key files being adapted to bind a plurality of software programs to a hardware key without the programmers of the software programs knowing in advance the responses of said hardware key. The process includes an instruction file for a software program containing instructions on what codes will be transmitted to the hardware key by the software program and describing where the software program will look in a file for responses transmitted back by the hardware key. A description file contains formula descriptions of the responses of the hardware key, and a software key creation program reads in the instruction file and following its instructions, creates a software key file containing hardware key responses, responses to codes listed in the instruction file and calculated according to the formula descriptions in the description file.

1 Claim, 3 Drawing Sheets

SOFTWARE PACKAGE WITH EMBEDDED SOFTWARE KEY

1

UNIVERSAL SOFEWARE KEY PROCESS

This is a continuation of application Ser. No. 08/398,923 filed on Mar. 6, 1995, now abandoned.

FIELD OF THE INVENTION

This invention relates to software protection, specifically to significantly enhancing the capabilities of hardware keys for software on the market today.

BACKGROUND ART

A serious problem currently exists in the field of computer software. That problem is software piracy. Not only is software piracy preventing software programmers from earning billions of dollars rightfully due to them in the U.S. and other countries throughout the world, but it is also slowing the progress of moving paper publishing and analog video publishing to the digital software medium.

Many software protection schemes exist today, but the most effective ones currently in use involve those using hardware based electronic security devices (hardware keys). U.S. Pat. Nos. 4,654,792 and 4,685,055 issued to Thomas show such a data processing system, including the means for verifying the authority of data-entry devices to input data and the authenticity of such data as well as communication of validation codes to hardware keys.

While such a protection scheme is quite effective in combating software piracy, such protection requires precise knowledge of responses returned from a hardware key by a software programmer. As a result, the hardware key can only be used by one developer who knows what specific responses to program his software to look for from the hardware key.

Such required prior knowledge of the hardware key limits their use to one per application or several applications developed by the same software programmer. However, with many thousands of software applications on the market today, connecting a separate hardware key to a computer system for each software application becomes a real hindrance to computer users.

OBJECTS OF THE INVENTION

Several objects of the present invention are:

a) to provide a way by which software programmers can program their software to work with any hardware key of a particular brand without knowing the hardware key's responses beforehand; and b) to provide a way which would allow an unlimited number of software programs, each with an unlimited number of software locks, to work with any hardware key of a particular brand.

SUMMARY OF THE INVENTION

The process begins when a Dealer/Lessor of software requests a software key for a User's specific hardware key. The software key will be embedded in a software package to be sold or rented to the User by the Dealer/Lessor. The software key is created at the Universal Software Key Company and electronically transmitted to the Dealer/Lessor for embedding in the software package by way of a Binding Process.

Two important files are required for the creation of the software key file by the software key creation program: (1) the instruction file (containing instructions on what codes will be transmitted to a hardware key by the software program and describing where the software program will look in a software key file for the responses transmitted back by the hardware key); and (2) the description file (containing formula descriptions of the responses of a hardware key). The instruction file is a highly secure file provided by the Software Source only to the Universal Software Key Company. The description file is a file unique to the hardware key of the User.

Using these two files, the Universal Software Key Company's software key creation program is able to read in the instruction file, and, following its instructions, create a software key file containing hardware key responses, which are responses to codes listed in the instruction file and calculated according to the formula descriptions given in a description file.

The software key is then embedded in the software package sold or rented to the User, and thenceforth the software package can only be run a computer that has the User's specific hardware key.

DETAILED DESCRIPTION OF THE INVENTION

Referring initially to FIGS. 1 through 4, the various entities in the software key creation process are illustrated. The entities include the Universal Software Key Company 10 (USK Company), a Software Source 12, a Dealer/Lessor 14, and a User 16. USK Company 10 is a company whose primary purpose is the creation and distribution of software keys. Software Source 12 is a company that distributes software packages on a wholesale basis through a network of dealer/lessors, like Dealer/Lessor 14. User 16 is a typical retail purchaser or renter of software.

Figure 1:
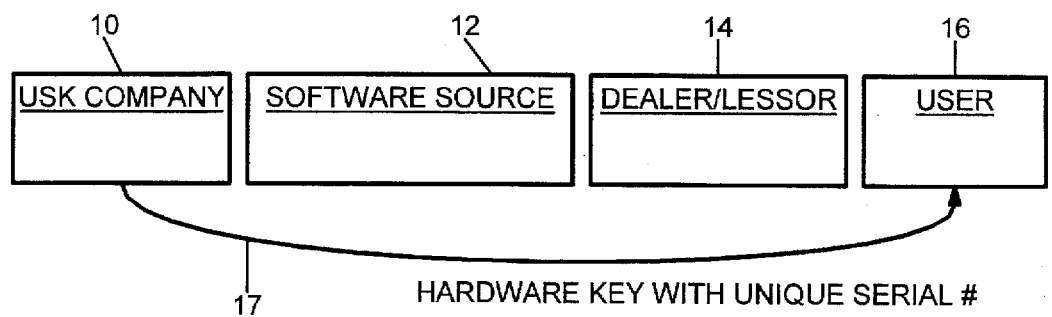
FIGS. 1 through 4 depict the distribution steps of the universal software key creation process.

As shown in FIG. 1, a preexisting step in the process is illustrated by arrow 17, where a user has previously acquired from USK Company 10 a hardware key with a unique serial number. The USK Company maintains in its file a data base that includes unique descriptions in description files that are associated with each serial number. It is contemplated that many User 16s will have their own hardware keys, each with a unique serial number that is known to the USK Company 10. It is anticipated that the USK Company 10 will be the primary vendor of hardware keys that will be utilized in the process of the present invention.

Figure 2:
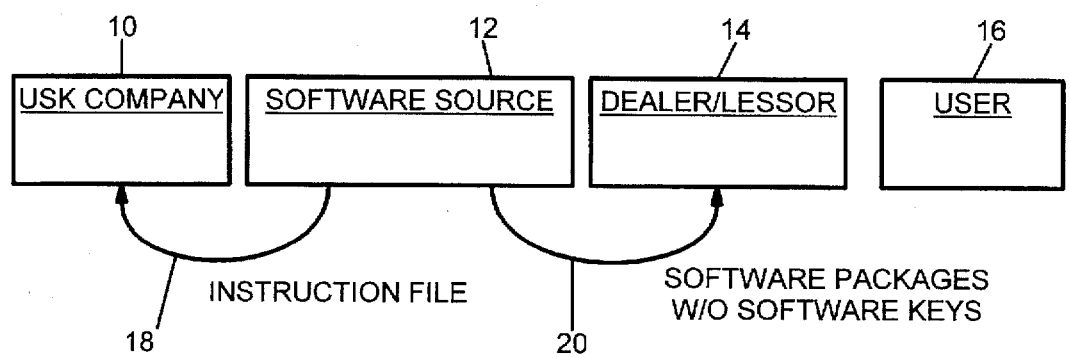

Referring to FIG. 2, the Software Source 12 distributes wholesale quantities of software packages, without software keys, to its dealer/lessors, such as Dealer/Lessor 14. The distribution of software packages without software keys is illustrated by arrow 20. Prior to distribution of the software packages, the Software Source provides an instruction file to the USK Company 10. It is contemplated that multiple Software Sources 12 will provide their instruction files to the USK Company, so that the USK Company 10 is a single source of software keys for multiple Software Sources 12.

Figure 3:
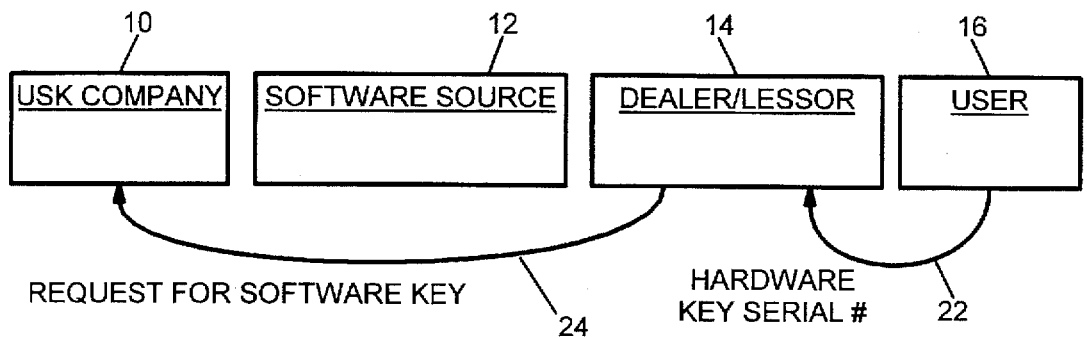
Figure 4:
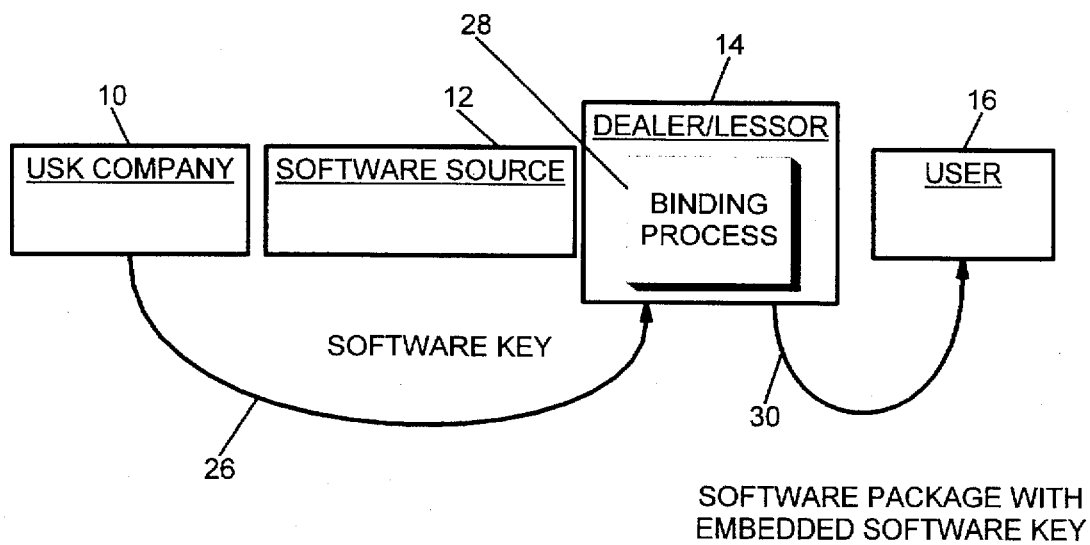

In FIG. 3, a typical retail transaction is illustrated, in conjunction with FIG. 4. In the retail transaction, User 16 provides his hardware key serial number to the Dealer/Lessor 14, as illustrated by arrow 22. At that time, the User 16 has selected a software package that he would like to buy or rent. Dealer/Lessor 14 then transmits, preferably electronically, a request for a software key to USK Company 10. Then, as illustrated in FIG. 4, USK Company 10 creates the software key and transmits it back to the Dealer/Lessor 14. The transmission of the software key is illustrated by arrow 26. Dealer/Lessor 14 then activates binding process 28, which embeds the software key in the software package purchased or rented by User 16. The software package with the embedded software key is then transferred to User 16 who can use the software package on any computer that has his specific hardware key attached to it. The retail transaction illustrated in FIGS. 3 and 4 preferably takes place electronically, in a matter of minutes as the user selects and pays for his purchase or rental of software.

Figure 5:
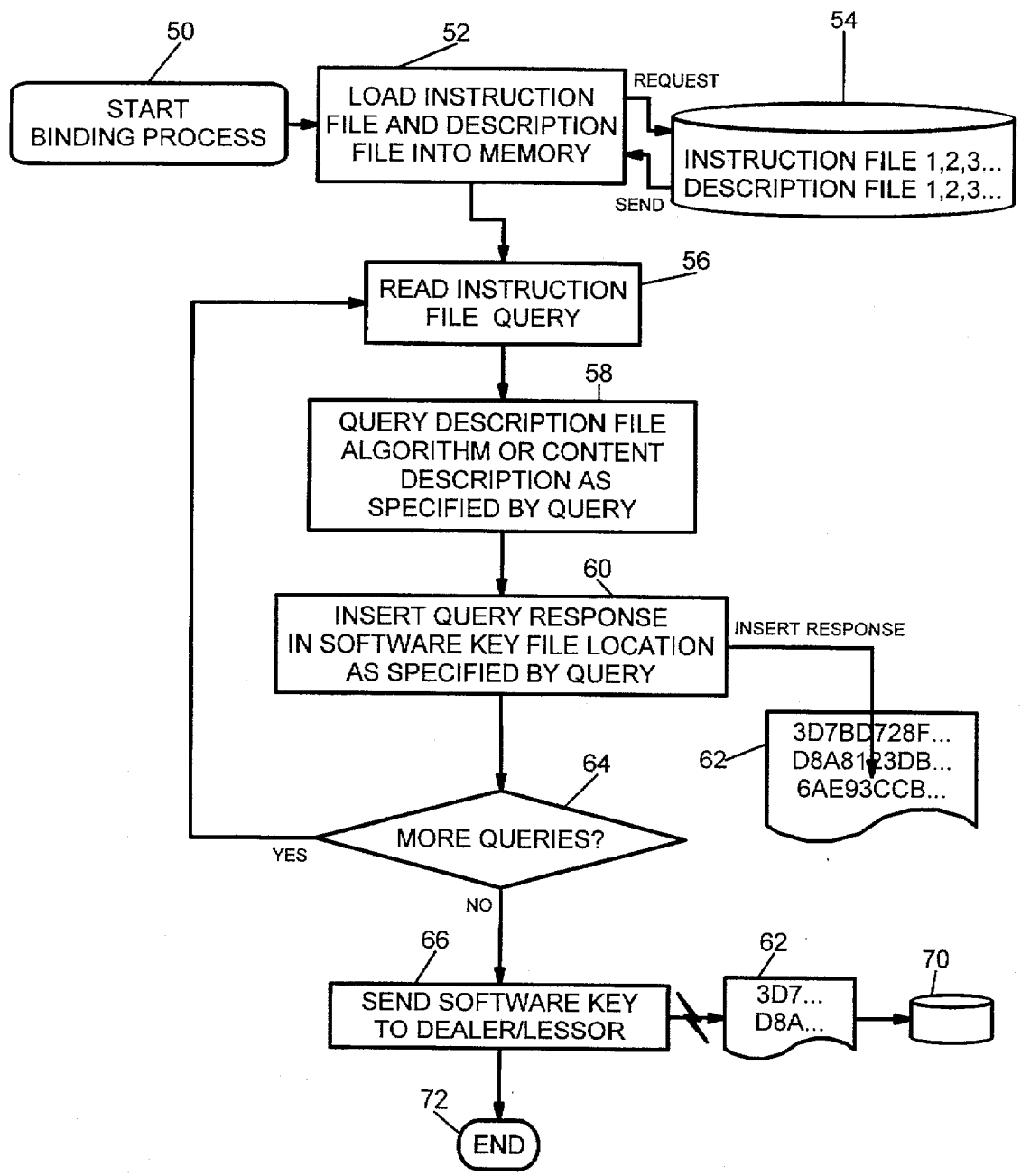
FIG. 5 is a flow chart depicting the Binding Process used to create software keys specific to a user's hardware key and a specific software.

Referring now to FIG. 5, the binding process 28 is illustrated in the form of a flow chart. Step 50 starts the binding process 28 when the request for a software key (reference numeral 24, FIG. 3) is transmitted to the USK Company 10. As previously discussed, the request for a software key includes the identification of the software package as well as the User 16's hardware key serial number. At USK Company 10, step 52 involves the loading of the instruction file and description file into memory from data base 54. As previously discussed, the instruction file has previously been provided by the Software Source 12, and the description file is a file that is unique to the hardware key serial number of User 16. In step 56, the first instruction file query is read, and then the query is applied to the description file algorithm or content description as specified by the query to return a response. In step 60, the query response is inserted into software key 62 as specified by the query. At decision step 64, it is determined whether additional queries exist in the instruction file. If so, the process loops back to step 56 and is repeated until there are no more inquiries. Then, at step 66, the completed software key 62 is sent electronically to the dealer/lessor to be embedded in the software package 70. The process then ends at step 72.

In operation, this invention allows software to be copied and distributed openly over any medium at any time without the usual worry of illegal piracy. This technology is based on the Universal Software Key Process.

The Universal Software Key Process has its software protection strategy based on "hardware key" technology. Many developers today are protecting their programs and the revenue they get from them by controlling software execution. Quite different from software copy protection, execution control allows users to make unlimited back-up copies. Yet operation is limited to licensed users.

A hardware key attaches to the parallel interface port on the back of the user's computer. Hardware key operation is transparent to the end-user—computer and peripheral operations are unaffected. But if the hardware key is removed, the software application will not operate. It is simple, reliable and the most fundamentally secure way to protect programs.

Thousands of developers worldwide have found that these hardware keys, coupled with the latest technology, offer developers the most reliable, compatible and secure form of protection available.

The Universal Software Key Process takes this one step further and makes it practical to distribute software and hardware keys separately, and "bind" them together when rented or sold. An unlimited number of programs can now be bound with one hardware key. Software can also be freely distributed or rented with out worry of significant loss of revenue through piracy.

To program its software to take advantage of the Universal Software Key Process, the Software Source must program software locks into software packages to be distributed. The Software Source may program as many locks as it wishes into its software applications.

After the Software Source puts in its software locks, it transfers the program's instruction files to the USK Company.

To execute a program protected under this process, a User's computer must first search its default directory for the software key file. If not found, it must then search the directory path. If still not found, it must then search the A drive floppy in directories A:\1, A:\2, A:\3, A:\4, A:\5, A:\6 for the software key file. If still not found, the program will terminate and give an explanation.

If the software key file is located, the software will then load into memory the software key file's developer ID and activate only the first hardware key to make sure the proper one is attached. The software key file's hardware key duplicate serial number must also be loaded into memory and checked to make sure it is equal to or less than the actual hardware key duplicate serial number.

The program will then test the system to make sure it meets minimum requirements for running the software. If it does not meet the minimum requirements, it will terminate and give an explanation.

After activating the hardware key, the software will then load the software key file's various values and execute properly when the right values are found that match the responses sent from the hardware key.

If there are any work files that need to be created by the program, they must be created within the same directory that the software key file was found. Maximum available directory space would be ⅙ of the total available space in that directory. Example: for an empty 1.2 Meg disk, there is 200K available. 200K of free disk space is also the minimum the program must be able to work with.

The instruction file transmitted to the USK Company by the Software Source contains the instructions on creating the software key file to be used by software with hardware keys programmed with random algorithms and transferred by the USK Company to Users. The instruction file will preferably be a plain ASCII text file, with each line ending with ASCII dec 10 and 13 characters. There are no blank lines in the file.

Using the instructions from this file, a software key file will be created that the program can use only with a User's specific hardware key. Only the USK Company will be authorized to possess the instruction file to create software key files. The name for the example instruction file shown below would be 1.

Example of Instruction File

SPACE BLASTER VER 1.0,75 00,1994-1-1.KEY
201E804675D4834FD07A49D905B92B1BB0053F616F5B03E541DAE3B1A3339D086D64747E742B056F
47AE31BEB2D87D08E3491512586555895E2C9DF331AAD7A2678DA4CA7F922F0A7F1AEC7D35F94C31
802EA200CBC7E5E5DBE5C5DACB41B0FF94BA1FA3BB18A9CC9FF25C14224EE2F002A61AA1831B94DF

-continued

993606F995C4581B2AC83E753971D7E9A68D20B9DFDF1763D688C3974909CE6DFEBA0DF92730D598
F012267A399CB10302D3FDCA01EF5F9982CB1CF0C3C2D093F5B9E28A01AF898806CDB57F524C7B7F
9CF9CCF42218697412817D95352CE399C926F59C457101E5E4437AA26DDEB65973C372A141A3BCE2
08155ADA3E79B2440A59C9E1E6C33A0F0FD7BB79D782D14B47503AFDFB3A7A2FE1044C0A6A02FD42
F52C6EF974498916B033DE90E4ED5FADF4EC6DC18F25B8406C4D522DF2B8A2A22203E4A72325A84E
9705B36F3B926DB105E26AF1C364E6D097BD14E0637A52A654FF5862BB6561ACBCB7B1062895855D
6ABC98C6AB75DDBED3E0283BD8C40876F33C84115564286EA5FB37DEE66FC50D537040DE31E28FA7
DEID,3E,A73C82F0,943,4,953,4
HKSN,2C,545B5025,525,4,530,4
RAND,1A,D5923456,420,3,450,3,470,2
EXAC,20,01233456,12345678,301,4,310,4

Explanation of Instruction File

SPACE BLASTER VER 1.0,75.00,1994-1-1.KEY

Info Line . . . Name of software program the instruction file is used to create software key files for, retail selling price of software program, and name of software key file to be created.

201E804675D4834FD07A49D905B92B1BB0053F616F5B03E541DAE3B1A3339D086D64747E742B056F
47AE31BEB2D87D08E3491512586555895E2C9DF331AAD7A2678DA4CA7F922F0A7F1AEC7D35F94C31
802EA200CBC7E5E5DBE5C5DACB41B0FF94BA1FA3BB18A9CC9FF25C14224EE2F002A61AA1831B94DF
993606F995C4581B2AC83E753971D7E9A68D20B9DFDF1763D688C3974909CE6DFEBA0DF92730D598
F012267A399CB10302D3FDCA01EF5F9982CB1CF0C3C2D093F5B9E28A01AF898806CDB57F524C7B7F
9CF9CCF42218697412817D95352CE399C926F59C457101E5E4437AA26DDEB65973C372A141A3BCE2
08155ADA3E79B2440A59C9E1E6C33A0F0FD7BB79D782D14B47503AFDFB3A7A2FE1044C0A6A02FD42
F52C6EF974498916B033DE90E4ED5FADF4EC6DC18F25B8406C4D522DF2B8A2A22203E4A72325A84E
9705B36F3B926DB105E26AF1C364E6D097BD14E0637A52A654FF5862BB6561ACBCB7B1062895855D
6ABC98C6AB75DDBED3E0283BD8C40876F33C84115564286EA5FB37DEE66FC50D537040DE31E28FA7

Random Lines . . . Random character lines, each 100 characters long, are used to help create the random lines of the software key file. 10 (minimum) to 100 (maximum) lines are preferably required.

DEID,3E,A73C82F0,943,4,953,4

DEID Line(s) . . . Line(s) that instructs on where a hex number that is subtracted from an algorithm cell response will result in a hex number equal to the hardware key serial number can be found. 3E is the algorithm cell location in the hardware key that the next hex number, A73C82F0, will be sent to. 943 is the starting dec number location in the software key file telling where to begin reading in the hex number to be subtracted from the response returned from 3E after sending A73C82F0 to it. The next dec number, 4, tells how far, starting at 943 to read the hex number. The next dec number, 953, is the next starting location in the software key file telling where to begin reading in the continuation of the hex number to be subtracted from the response returned from 3E after sending A73C82F0 to it. The hex number sent to the algorithm cell must be 8 characters long. At least one DEID line is required.

HKSN,2C,545B5025,525,4,530,4

HKSN Line(s) . . . Line(s) that instructs on where a hex number, that is subtracted from an algorithm cell response will result in a hex number equal to or less than the hardware key duplicate serial number, can be found. 2C is the algorithm cell location in the hardware key that the the next hex number, 545B5025, will be sent to. The hex number that is subtracted will be expected in the following dec number locations of the software key file (525,4,530,4). If the hardware key duplicate serial number that is calculated through the software key file is greater than the actual hardware key duplicate serial number, cell 0B, the program must terminate. The hex number sent to the algorithm cell must be 8 characters long. At least one HKSN line is required.

RAND,1A,D5923456,420,3,450,3,470,2

RAND Line(s) . . . Line(s) that instructs on where a random hex number sent back by the hardware key is to be put into the software key file. 1A is the algorithm cell location in the hardware key that the next number, D5923456, will be sent to. The random hex number sent back will be expected in the following dec number locations of the software key file (420,3,450,3,470,2). The hex number sent to the algorithm cell must be 8 to 12 characters long. RAND lines are optional.

EXAC,20,01233456,12345678,301,4,310,4

EXAC Line(s) . . . Line(s) that instructs on where a hex number is to be found in a software key file that is to be subtracted from a random hex number sent back by the hardware key and equal a hex number expected by your program. 20 is the algorithm cell location in the hardware key that the next hex number, 01233456, will be sent to. The following hex number, 12345678, is the exact hex number expected from the subtracting of a hex number found in the following dec number locations of the software key file (301,4,310,4). Exact hex numbers to be expected back (in dec form) must range from 1 to 268,435,455. The hex number sent to the algorithm cell must be 8 characters long. EXAC lines are optional.

It is up to the Software Source to do the following for its instruction files:

(1) Create the random character lines. (2) Select the algorithm cell numbers (even hardware key cells 10–3E). (3) Select the hex numbers to be sent to the algorithm cells. (4) Select the hex numbers expected (in EXAC lines). (5) Select the locations in the software key file to find hex numbers.

Hex number responses will be the same length of the numbers sent to the algorithm cells. The amount of protection a program will have will be directly proportional to the number and variety of DEID,HKSN,RAND,EXAC lines put in the software instruction file and the software is programmed to expect.

Software Key File

In the preferred embodiment, each line in a software key file created will be exactly 100 ASCII text characters long with characters 0 to 9, A to F, randomly mixed with values computed for the software. Each line will end with ASCII decimal 10 and 13 characters. There are no blank lines. The last line is a identifier stamp giving the name of the program the software key file is to be used with, the name of the software key file, the hardware key it's to be used with, and the date the software key file was created. The name for the software key file shown below would be 1994-1-1.KEY. Because the length of software key file names can be quite long, those developers writing programs for IBM compatible computers, must use Windows 4.0 or greater to allow their programs to use software key file names longer than 8 characters. All software key files will end with the extension of KEY.

Software Developer Numbers

Each Software developer who implements USK Company's software protection process will be assigned a unique USK Company developer number. That number will be based on the order in which the software developer was signed on by USK Company in a particular year. Thus if the software developer was 89th developer signed on in 1994, that developer would be assigned 1994-89. 1994-89 would also be that software developer's logon handle to USK Company's computer to upload instruction files for it's programs.

Whereas, the present invention has been described with the respect to a specific embodiment thereof, it will be understood that various changes and modifications will be suggested to one skilled in the art, and it is intended to encompass such changes and modifications as fall within the scope of the appended claims.

Example Software Key

4F2A90D229900844FD082BE3B22DBBFEEB5CB7EECCC3140A9E2BEBAFD19BDD811F89038200A46F3C
CE4BD4E83D7590A7B51013AF33ED2029151F0B4B704057F73260C28000078939CED7A68B320A8972
434EC15946636661F9640C0C750E841625A2C2871A2B9F113D5ED04EEFFCE67604D90A5DBD5B9757
993641A6E5C453F2E5C46ECBF53CB4223986B518A30ACCD0999CD4775FEDD71A8F96E470FBE041D7
B5F2E9258928FD93BEE4D56A18136DC31A10C3826EA36293D41E8CACD006E6E9B09D83975A05C899
315554EF4B1217B4684D1594352CD399C64CD86DE3A1D5E2A69F40159A72796354BF0B4325C13A60
35E2441304FF2B12BD1BD5D77795741E65395A6C95E8147B9FA753832663DE8877B617862904AC9C
6238C06A92DA08647A815FF2D3BEEF033006CE147033BDC7133338AE6D34A632C263BC99319E57D4
4FBD40165162080F38ECF3584C309C857439D6D55B061E485ED9FDE8D13D1060D52083005958DC14
1DC3D565124BE43C9191EDCE92322537F28E13D9D56428EBBD7937DE62C3FD2EA33BC8B6C30689E4
SPACE BLASTER VER 1. 0,1994-1-1. KEY,1994-1-1,09/23/94

Hardware Keys

All hardware keys to be used by Software Source programs and their software keys will be programmed with random algorithms by USK Company, and no two will be alike.

In one embodiment, the hardware keys are Sentinel SuperPro keys made by Rainbow Technologies, Inc. Cells 00, 01, 02, 03, 04, 05, 06, 07 are reserved for use by Rainbow Technologies, Inc.

Cell 08 will contain the year that the hardware key was programmed by USK Company.

Cells 09 and 0A will contain the number that the hardware key was programmed in the year shown in cell 08. Thus, if the hardware key was the 100th programmed by USK Company in 1994, cells 08, 09, 0A would contain 07CA, 0000, 0064 respectively.

Cell 0B will contain the duplicate serial number of that hardware key. Thus when the above hardware key, number 100 in 1994 was programmed, cell 0B would contain 0001. If the owner lost the hardware key in 1995, 1996, 1997 and received replacements each of those years, cell 0B in each of those hardware keys would contain 0002, 0003, 0004 respectively.

Cells 0C, 0D, 0E, 0F are reserved for future use by USK Company.

All even cells 10 to 3E will be programmed with the random algorithms.

I claim:

1. A process of creating software key files, said software key files being adapted to bind a plurality of software programs to a hardware key without the programmers of the software programs knowing in advance the responses of said hardware key, comprising in combination:

a) storing an instruction file for a software program, separate from said software program and located a third party location, containing instructions on what codes will be transmitted to said hardware key by said software program and describing where said software program will look in a file for responses transmitted back by said hardware key;

b) storing a description file, separate from said software program and created and located at a third party location, containing formula descriptions of said responses of said hardware key; and, c) executing a software key creation program, separate from said software program and located at a third party location, which reads in said instruction file and following its instructions, creates a software key file containing hardware key responses, responses to codes listed in said instruction file and calculated according to said formula descriptions in said description file.

* * * * *